Figure 1:
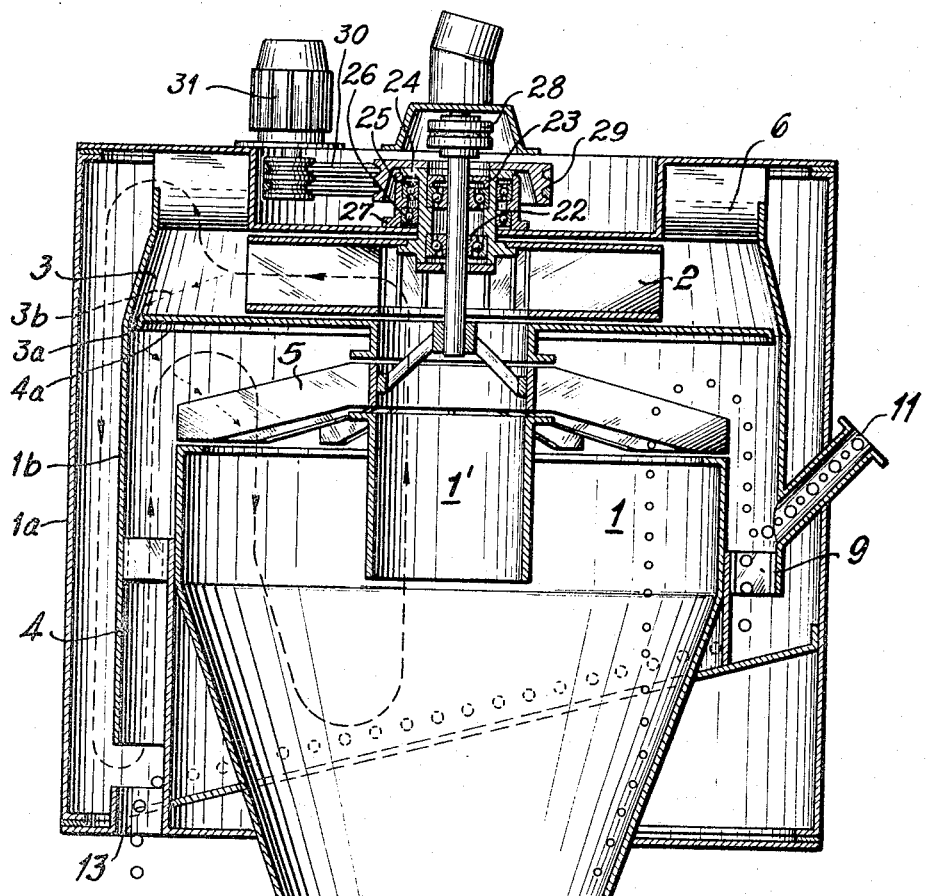

March 14, 1967 S. SCHAUER 3,308,949
SIFTER OF THE CIRCULATING AIR TYPE
Filed Dec. 31, 1964 2 Sheets-Sheet 1

INVENTOR
Siegfried SCHAUER
BY Robert H. Jacob
AGT.

United States Patent Office 3,308,949
Patented Mar. 14, 1967

3,308,949
SIFTER OF THE CIRCULATING AIR TYPE
Siegfried Schauer, Hohenecken, near Kaiserslautern, Germany, assignor to Gebr. Pfeiffer Barbarossawerke A.-G., Kaiserslautern, Pfalz, Germany
Filed Dec. 31, 1964, Ser. No. 422,611
Claims priority, application Germany, Jan. 2, 1964, P 33,305
7 Claims. (Cl. 209—133)

The present invention relates to sifters of the circulating air type and is particularly concerned with sifters used in mills.

The circulating air type sifters of known construction commonly cooperating with mills are provided with a separator for fine substances which is usually in the form of a cyclone or of the cyclone type as well as with means for carrying off the separated grit. In such structures the separators for the fine substances are arranged either centrally of the sifting space or circumferentially thereof. In other known embodiments a plurality of such separators for fine substances is grouped around the sifting space.

In all known forms of construction all or at least the main portion of the carrier air flow leaving the separator or separators for the fine material is directly conducted again through the grit that has been sifted out. Since the carrier air flow has given up the fine substances more or less satisfactorily, but never completely, it conducts the rest of those which have remained in it to the grit, which in its turn carries along a part of the fine material still contained in the carrier air stream. This results in the deterioration of the degree of separation or separation factor of a sifter, and directly connected with this also a decrease of the carrying effect of the air and resulting from this again a decrease in production capacity.

As a consequence the problem arose to find means and ways to eliminate this shortcoming, i.e., to find how the removal of dust from the carrier air flow can be improved before it is again brought in contact with the grit that has been sifted out.

The problem thus posed is solved by the invention by a circulating air sifter having a central cyclone as a separator for fine substances and a grit discharge means, where centrally above the cyclone a ventilator is arranged for producing the necessary current of circulating air as well as also a double acting sifting wheel for sifting the material and for producing a centrifugal force which acts on the solid particles carried along by the air current.

Preferably the ventilator for producing the circulating air flow and the double acting sifting wheel are provided with separate drive means to enable, above all, regulating the manner of operation of the sifting wheel by suitable choice of the velocity of rotation.

For additional dust removal from the carrier air current a depositing chamber may be arranged after the ventilator which produces the air current, in which connection the depositing chamber may be disposed in the range of the rotation imparted to the air current by the rotation of the ventilator, while a deflecting device may be provided between ventilator and depositing chamber which provides for radial adjustment of the air current in the depositing chamber.

A plurality of blinds or baffles and/or a filter can be arranged in sequence with the depositing chamber, which components are preferably provided above the depositing chamber which is arranged radially of the ventilator.

Furthermore, suitable guiding and reorienting means can be provided for returning the re-separated fine substances to the output material or substance.

For collecting and discharging the grit a nozzle ring or annular gap which surrounds the cyclone is provided in which an annular grid, arranged in steps, may be provided. Where the material supply feed means is arranged laterally, it leads to the said nozzle ring or annular gap where a rotating and/or vibrating receiving ring may be provided which serves for the generally even distribution of the material fed in over the entire circumference of the ring.

Figure 2:
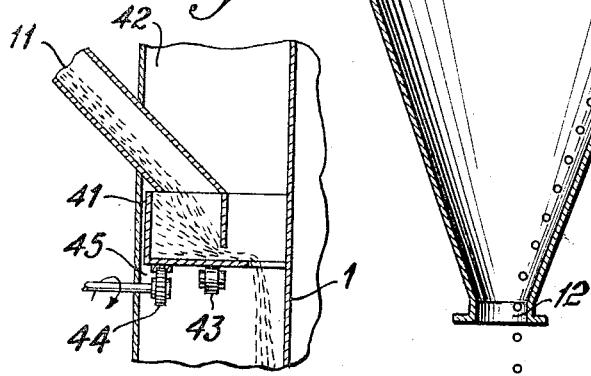
Figure 3:
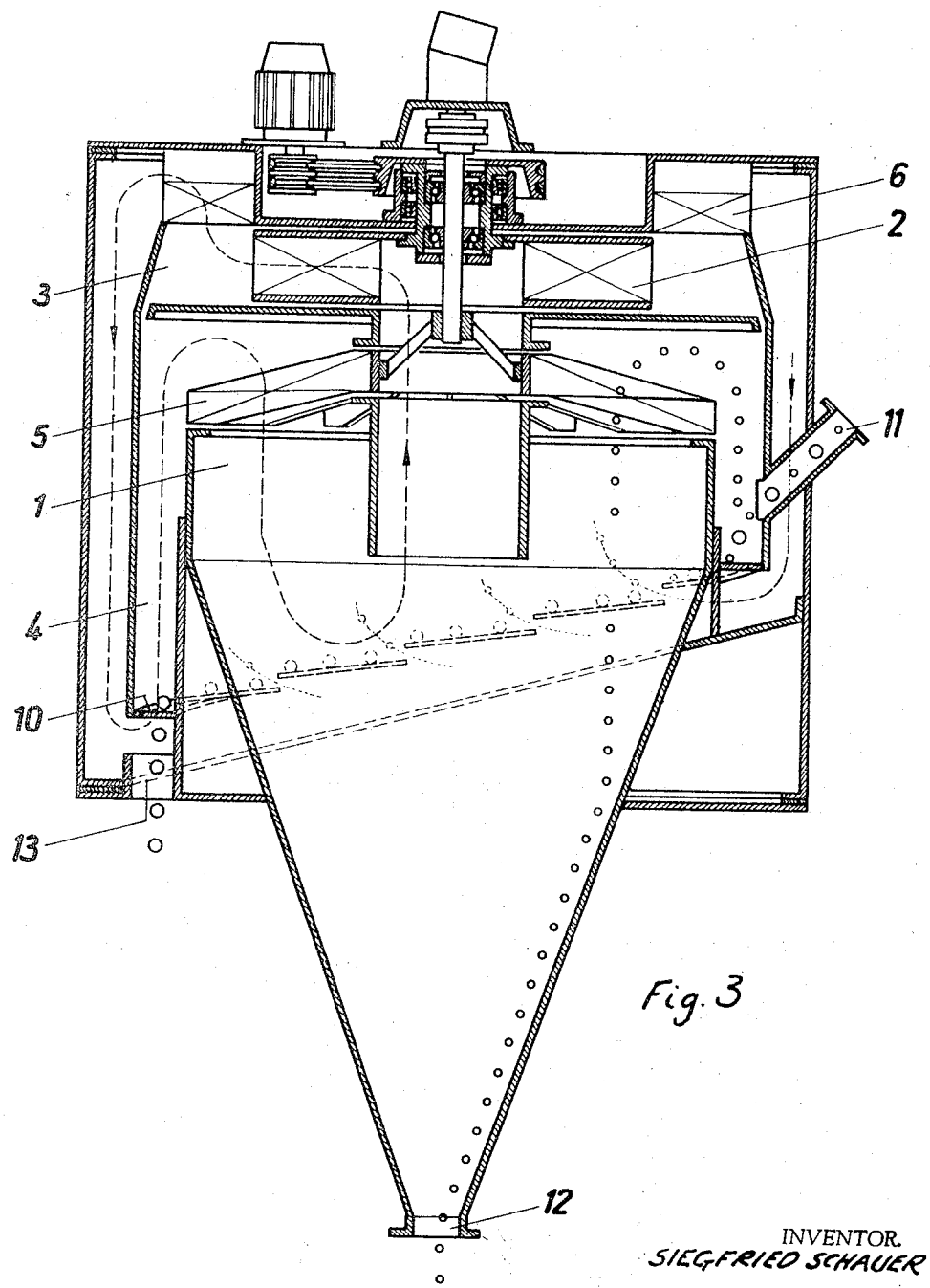

Further advantageous features of the invention will become apparent from the following description with reference to the accompanying drawing, in which FIG. 1 illustrates an embodiment of the subject of the invention; and FIG. 2 is a detail showing a rotating receiving or supply ring in accordance with the invention; and FIG. 3 illustrates a second embodiment of the invention employing a circular stepped grate.

A sifter of the circulating air type in accordance with the invention is illustrated which is equipped for lateral material feed. It comprises an outer housing 1a, an inner housing 1b and a cyclone 1 arranged centrally of said housing. The feeding in the illustrated embodiment of a sifter is effected by way of the lateral feeding pipe member 11. As shown in FIG. 1, the material is then distributed circumferentially by way of a dispersing ring such as a nozzle ring 9 while the gritty parts drop downwardly through the lower part of the nozzle ring. The remaining parts, i.e., the fine substances, are carried upwardly by an air current produced by the blower wheel 2 through the nozzle ring 9. This air current is drawn in by suction by the blower wheel 2 through a central air shaft 1' out of the centrally disposed cyclone 1 which serves as the separator for the fine substances. Furthermore a rotational movement is imparted to the air current by the blower wheel 2, thereby causing separation by centrifugal force of the major part of the finest particles in the space 3. The fines which are temporarily deposited in the space 3 are carried laterally by the circulating air through the gap 3a and returned to the effective range of the sifting wheel 5. This is indicated by the fine dash and arrow line 3b. The main air current that has again been subjected to dust removal is now conducted into the discharge space 4 for the grit and is further available for sifting.

The circulating spaces 3 and 4 are defined in the inner housing 1b which is separated into an upper and a lower space by a baffle or plate 4a.

A sifting wheel 5 in the form of a counter current blade system is provided which again conducts the material carried along by the air current to the cyclone 1. A set of baffles or blinds 6 are provided in the re-sifting or depositing space 3 for reorientation in the air current. In accordance with FIG. 3, the discharge chamber 4 for the grit is extended downwardly in cascade by a circular step by step grid 10; below this grid the discharge for the grit 13 is located. In both embodiments shown the cyclone 1 ends in the discharge aperture 12 for the fine substances.

In the discharge chamber 4 for the grit, where simultaneously the feeding of the material to be treated takes place through the feeding pipe 11, a rotating and/or vibrating dispersing ring 41 as shown in FIG. 2 may be provided for the even distribution of the material circumferentially of the chamber 4, which ring is disposed below the entrance of the feeding pipe member 11.

The material being sifted arrives through tube 11 on dispersing ring 41 which rotates in the annular gap 42 that is disposed around the cyclone 1. The dispersing ring 41 is supported around its bottom by rollers 43 and can be driven at one or more locations by one or more pinions 44, in engagement with a toothed crown ring 45, that are rotated by an external source of power.

In the embodiment in accordance with FIG. 3 a stepped grate 10 is employed where the air current can pass through between the individual steps and carry along whatever fine particles may still be contained in the deposited grit. Thus the fine particles or dust may be picked up by the air current before the sifted grit is discharged at the aperture 13.

The sifting wheel 5 has a shaft 21 that is journalled in two bearings 22 and 23, which in turn are disposed in a sleeve 24. This sleeve 24 is supported by means of bearings 25 and 26 in a sleeve 27.

A drive wheel 28 for the sifting wheel 5 is mounted on the shaft 21. Sleeve 24 is connected at its upper end with a drive wheel or pulley 29 for the blower wheel 2, while at its lower end it supports the blower wheel. The wheel 29 may be connected to be driven, for example, by a V-belt 30, to a drive motor 31. The drive motor for wheel 28 is not illustrated. In accordance with a preferred embodiment of the invention separate drive means for the sifting wheel 5 and the blower wheel 2 are provided; it is obvious, of course, that both wheels may be driven by a single motor.

By virtue of the construction of the sifter in accordance with the invention, particularly the double effect of the sifting wheel and the arrangement of the depositing chamber or space with the subsequently arranged baffles, efficient dust removal from the circulating air current is accomplished before it is returned to the areas where it contacts the material fed in. The sifting effect of the circulating air current is furthermore supported by the centrifugal force produced by the sifting wheel. This aforementioned dual effect of the sifting wheel is the result of a whirling movement whereby the fines are caused to follow a helical path along the wall of the cyclone 1 downwardly to the discharge opening 12 and of the centrifugal force which acts on the grit.

Having now described my invention with reference to the embodiment illustrated in the drawing, I do not wish to be limited thereto, but what I desire to protect by Letters Patent of the United States is set forth in the appended claims.

I claim:

1. Sifting apparatus of the circulating air type comprising an outer housing having a material intake, an inner housing and a cyclone arranged centrally of said housings, said cyclone defining a separator for fine substances and for grit and having a discharge aperture at its lower end for fine substances, a baffle arranged in and defining an air gap with said inner housing above said cyclone and dividing said inner housing into an upper centrifugal separating space and a lower grit discharging chamber and air circulating space for the upward flow of air, said outer housing having a grit discharge aperture disposed below and in receiving relation to said discharging chamber and said inner housing having an open upper end in air circulating relationship with said outer housing, the walls of said inner and said outer housing defining an air circulating space for downward flow of air, a central air shaft arranged centrally in the upper end of said cyclone, dispersing means arranged in said discharging chamber around said cyclone and below said material intake, a sifting wheel rotatably mounted above said cyclone at the upper end of said lower grit discharging chamber and air circulating space, a blower wheel rotatably mounted above said baffle in said centrifugal separating space, and means for rotating said sifting wheel and said blower wheel to circulate air flow through the upper end of said cyclone, said air shaft, said blower wheel upwardly therefrom into and downwardly in said air circulating space, upwardly in said chamber through said dispersing means to said sifter and said cyclone.

2. Sifting apparatus in accordance with claim 1 where said blower wheel cooperates with said baffle and said air gap to define a second path of air flow downwardly to said sifter.

3. Sifting apparatus in accordance with claim 2, where the blades of said sifting wheel are operative to impart a helical downward movement to fines and a centrifugal force to coarse material.

4. Sifting apparatus in accordance with claim 1 including a plurality of baffles arranged above said blower wheel and said upper separating space.

5. Sifting appartus in accordance with claim 4 where said separating space includes a depositing space for repeated dust removal from the circulating air current, said depositing space extending radially of said blower and below said baffles.

6. Sifting apparatus in accordance with claim 5, where said dispersing means is a nozzle ring.

7. Sifting apparatus in accordance with claim 1, where said dispersing means comprises an annular grid arranged in downwardly cascading steps for collecting and discharging the grit.

References Cited by the Examiner

UNITED STATES PATENTS 2,188,634  1/1940  Sturtevant _____ 209—139

FOREIGN PATENTS 618,480  10/1935  Germany.

FRANK W. LUTTER, *Primary Examiner.*